United States Patent [19]

Oughstun

[11] Patent Number: 4,769,614
[45] Date of Patent: Sep. 6, 1988

[54] UNSTABLE OPTICAL CAVITY WITH MODIFIED FRESNEL ZONE

[75] Inventor: Kurt E. Oughstun, Madison, Wis.

[73] Assignee: United Technologies Corporation, Hartford, Conn.

[21] Appl. No.: 890,572

[22] Filed: Jul. 25, 1986

[51] Int. Cl.$^4$ ............................................. H01S 3/08
[52] U.S. Cl. ..................................... 330/4.3; 372/95
[58] Field of Search ................ 372/19, 95, 99, 92; 330/4.3

[56] References Cited

U.S. PATENT DOCUMENTS

| 3,573,656 | 4/1971 | Marcatili | 372/99 X |
|---|---|---|---|
| 3,577,094 | 5/1971 | Tomlinson | 372/99 |
| 3,622,907 | 11/1971 | Tomlinson | 372/95 X |
| 3,715,685 | 2/1973 | Gordon et al. | 372/19 |
| 3,808,554 | 4/1974 | Lax et al. | 372/95 X |
| 3,873,942 | 3/1975 | Reilly | 372/95 |
| 4,025,172 | 5/1977 | Freiberg | 372/99 X |
| 4,050,036 | 9/1977 | Chambers et al. | 372/99 X |
| 4,170,405 | 10/1979 | Sziklas | 372/95 |
| 4,219,254 | 8/1980 | Macken | |
| 4,267,524 | 5/1981 | Paxton et al. | 372/95 |
| 4,393,303 | 7/1983 | Spinhirne | 372/95 X |
| 4,477,909 | 10/1984 | Salvi et al. | 372/99 X |

OTHER PUBLICATIONS

"Optics", Hecht et al., 1979, pp. 375-376, Addison-Wesley.
"Introduction to Classical and Modern Optics", Jurgen R. Meyer-Arendt, 1972, pp. 200-202.

Primary Examiner—Thomas H. Tarcza
Assistant Examiner—Mark Hellner
Attorney, Agent, or Firm—Eric W. Petraske

[57] ABSTRACT

An improved unstable optical cavity for optical amplifiers or laser oscillators is made effectively single mode by altering the central Fresnel zone of the back mirror in order to provide constructive interference at the plane of the output aperture.

3 Claims, 2 Drawing Sheets

UNSTABLE OPTICAL CAVITY WITH MODIFIED FRESNEL ZONE

The Government has rights in the invention pursuant to Contract No. F29601-82-C-0089 awarded by the Department of the Air Force.

DESCRIPTION

1. Technical Field

The field of the invention is that of unstable optical cavities such as those used in power amplifiers and high-power lasers.

2. Background Art

It has long been known in the field that the mode losses for unstable resonators formed from spherical mirrors with circular cross sections not only interleave but have minima and crossover points that are periodic with, respectively, half-integer and integer parameters of the equivalent Fresnel number. As a result of this, a cavity may well be capable of supporting more than one mode. It is well known that it is highly desirable to have a substantial degree of mode separation because it is of fundamental importance that only a single transverse mode at a given wave length be supported by the cavity.

Among the methods that the prior art has used in order to achieve mode separation, is that illustrated in an article by G. L. McAllister et al., in the IEEE Journal of Quantum Electronics, Volume QE-10, Number 3, Mar. 1974. These authors used mirrors having a tapered reflectivity and shaped apertures in order to reduce the effects of diffraction from the edges of the mirrors and apertures in the system. Another approach is illustrated in U.S. Pat. No. 4,477,909 by Salvi et al., in which sharp edges are deliberately introduced at the edge of the output aperture in order to provide diffraction that reinforces instead of canceling.

3. Disclosure of Invention

The invention relates to an improved unstable optical cavity for optical amplifiers or laser oscillators, in which the cavity is made effectively single mode by altering the central Fresnel zone structure of the cavity.

In a preferred embodiment, a highly transparent coating that shifts the phase of the radiation reflected from it by pi with respect to the adjacent area is placed in a predetermined central portion of the large back mirror.

Other features and advantages will be apparent from the specification and claims and from the accompanying drawings which illustrate an embodiment of the invention.

BEST MODE OF CARRYING OUT THE INVENTION

Figure 1:
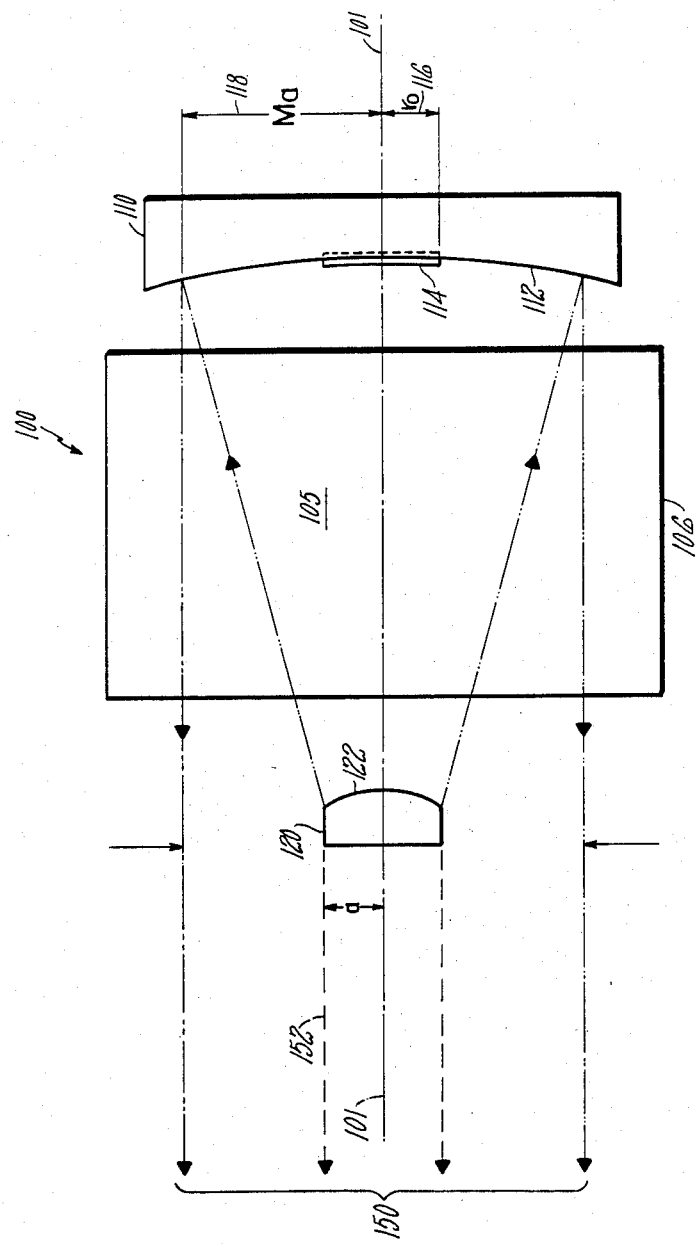
FIG. 1 illustrates in partially schematic, partially pictorial form an embodiment of the invention.

FIG. 1 illustrates in highly simplified form, an unstable optical resonator 100 having a concave mirror 110, referred to as the back mirror, and a convex mirror 120, referred to as the feedback mirror, disposed along axis 101 and forming an unstable optical resonator of a standard type well known to those skilled in the art. Within cavity 100, there is located gain medium 105 and associated pumps, windows, means for producing an inversion and the like that are schematically represented by a box 106 for simplicity and are well known to those skilled in the art. Radiation resonates within cavity 100, diverging as it travels back and forth between the two mirrors until it finally exits along output beam 150 through aperture 140. Aperture 140 is illustrated symbolically by a pair of arrows and is formed by the feedback mirror. The plane of aperture 140 is referred to as the feedback aperture plane. Concave mirror 120, of course, blocks the central portion of beam 150 as is indicated by the dotted lines 152. Concave mirror 120 has a radius indicated by "a" and aperture 140 has a radius indicated by "Ma", where "M" is the magnification of the optical cavity 100.

A measure of the stability of the optical cavity is the mode separation ratio, which is given by the ratio of the magnitude $g_1$ of the eigenvalue of the lowest loss mode to the corresponding eigenvalue magnitude $g_2$ of the next lowest loss mode that is capable of being supported by the cavity. For a typical cavity design according to standard practice, this quantity is approximately 1.2 in magnitude. The larger the value of this ratio, the greater is the ability of the cavity to reject the undesired modes in favor of the single desired mode. The terminology in the art conventionally refers to the rejected modes as the higher-order modes. In the case of unstable optical cavities, however, the lowest loss mode is not necessarily the lowest order mode, because the amount of loss overlaps and interleaves as a function of cavity parameters as was pointed out in the background section.

The present invention does not follow the prior practice in the art of smoothing the edges of the optical elements or deliberately inserting sharp edges that will produce cancellation of diffractive contributions. Rather, it addresses the problem in a more straightforward fashion by directly interacting with the central Fresnel zone structure of the cavity mode. Let the the cavity Fresnel number be given by $$N_{eq} = N + f \qquad (1)$$

where "N" is an integer and "f" lies between zero and one. For a good cavity design in conventional practice, "f" is approximately equal to ½.

For a cylindrically symmetric cavity the feedback aperture, 140, may then be divided into a series of concentric annular Fresnel zones with radii $$r_n = a \left[ \frac{n+f}{N_{eq}} \right]^{\frac{1}{2}}; n = 0, 1, 2 \qquad (2)$$

where "a" denotes the transverse radius of the circular feedback aperture, determined by the radius of mirror 120 in this embodiment. By its construction, each such Fresnel zone is pi out of phase with its adjacent Fresnel zones. Similarly the Fresnel zone structure at the back element of the cavity, mirror 110, is given by $$r_n' = Ma \left[ \frac{n+f}{MN_{eq}} \right]^{\frac{1}{2}}; n = 0, 1, 2 \qquad (3)$$

where "M" is the cavity magnification. For convenience, equation 3 may be rewritten as follows:

$$\epsilon_n = \frac{r_n'}{Ma} = \left[\frac{n+f}{MN_{eq}}\right]^{\frac{1}{2}} ; n = 0, 1, 2 \qquad (4)$$

The central Fresnel zone at mirror 110 is given by the expression on the right side of equation 4 when "n" is zero. If a quarter-wavelength etching (having a thickness that increases the optical path through the etching by half a wavelength compared to the same path without the etching) is applied to the central Fresnel zone of the back of the cavity so that radiation reflected from it is shifted in phase by pi with respect to the most Fresnel zone (where "n" equals one), then the field contributions from these two zones with constructively interfere with each other in the plane of aperture 140. Those skilled in the art will appreciate that this constructive interference will increase the central intensity level of the desired cavity mode, thereby increasing its associated eigenvalue magnitude and improving the cavity stability. Other modes will possess a different radial intensity dependence and thus will be affected differently by the treatment at the center of mirror 110. There will be a greater degree of destructive interference for these other modes, since the Fresnel zones for a different mode will have different radii. The net effect is thus that the desired mode is enhanced relative to the undesired modes. Those skilled in the art will recognize that a half wavelength shift may also be provided by applying conventional coating to the Fresnel zone. For the purposes of this application the term "treated" will be used to cover both a coated area and an etched area. The choice of which method to use is a matter of convenience. In FIG. 1, the central Fresnel zone is indicated by the numeral 114 and is shown alternatively as a coating extending out from the surface or as an etching.

Figure 2:
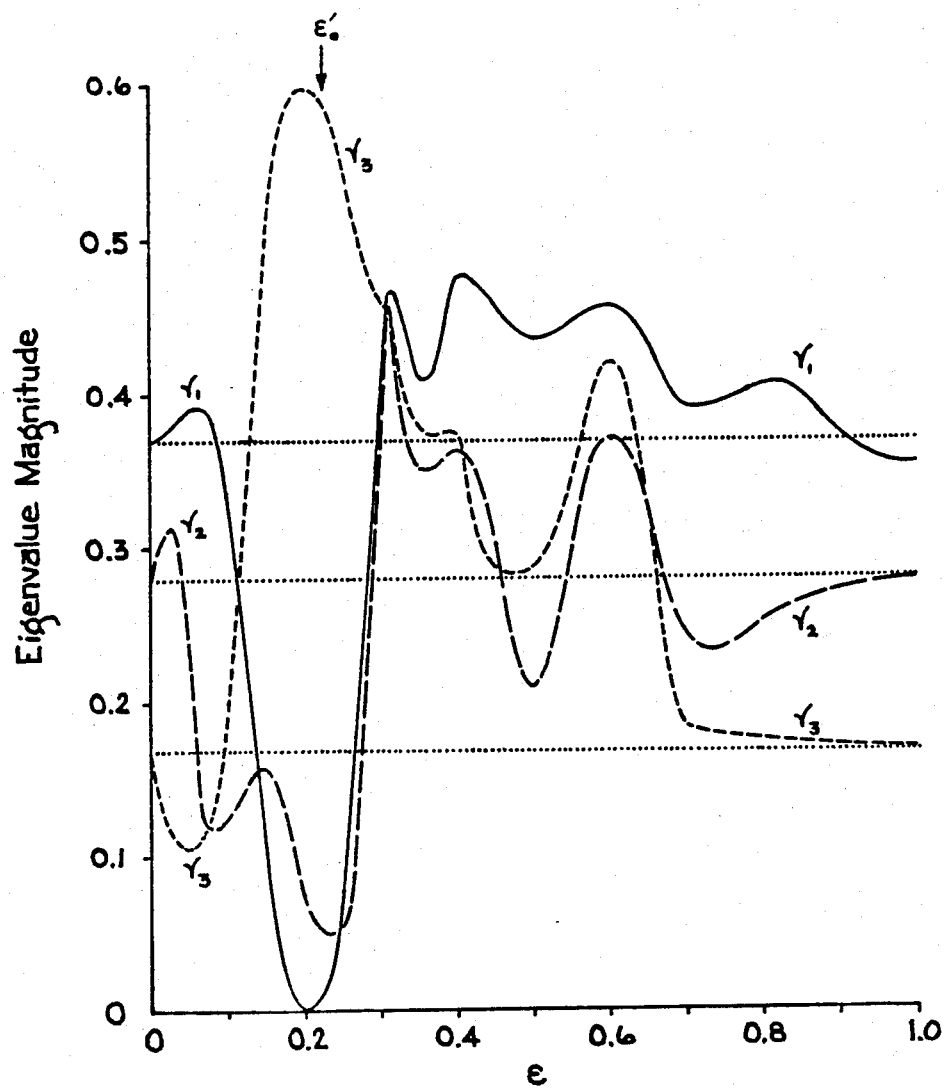
FIG. 2 illustrates a graph showing a parameter relevant to the operation of the invention.

FIG. 2 illustrates the result of numerical calculations for a cavity of magnification M=4, $N_{eq}$=2.5. Three curves labeled $\gamma_1$, $\gamma_2$, and $\gamma_3$ are shown, showing the amplitude eigenvalues $\gamma_i$, starting from initial values in which the eigenvalues are not greatly different and $\gamma_1$, $\gamma_2$, >$\gamma_3$ to an area in the vicinity of $\epsilon$=0.2 where the preferred mode $\gamma_3$ has an eigenvalue magnitude that is clearly separated from the other two. The calculated value of $\epsilon_0'$ for the central Fresnel zone is marked on curve $\gamma_3$ showing that the peak of that curve is very close to the predicted value. The eigenvalues plotted in FIG. 2 are the amplitude eigenvalues which are the square roots of the power eigenvalues. The power eigenvalue is the amount of power fed back into the resonator relative to the amount of power incident on the reference plane for a bare cavity. For a larger-magnitude eigenvalue, more power remains within the core of cavity 100 and it will operate with a smaller effective gain. Thus, the gain can be adjusted, as is known to those skilled in the art, so that the undesired modes will not have enough gain to maintain themselves and will be below threshold. The cavity will then effectively be a single-mode cavity.

It can be seen that at $\epsilon \approx \epsilon_0'$ =0.2, the radius predicted by equation (4) when n=zero, one mode has a much greater eigenvalue than the others. It is interesting that this dominant mode has the lowest magnitude eigenvalue when $\epsilon$=zero (i.e. for no coating). It should also be noted that, if it is necessary to support the mode indicated by $\gamma_1$ (because of a favorable intensity distribution or ease in coupling out of the cavity, say) the coating could have a radius determined by $\epsilon$=0.5 or $\epsilon$=0.8. The use of an annular coating determined by some non-zero value of n could also be used to enhance some desired mode at the expense of other undesired modes.

The optical cavity illustrated is a confocal positive branch type, in which feedback 120 mirror is convex and back mirror 110 is concave. Those skilled in the art will appreciate that the invention disclosed herein may be applied to other types of unstable optical cavities such as cavities having the form of a cylindrical shell, and the following claim is not meant to be limited by the disclosed embodiment.

It should be understood that the invention is not limited to the particular embodiments shown and described herein, but that various changes and modifications may be made without departing from the spirit and scope of this novel concept as defined by the following claims.

I claim:

1. An unstable optical resonator comprising:
   a feedback mirror located on an axis;
   a back mirror oriented on said axis with respect to said feedback mirror to form an unstable optical cavity and having a back mirror surface directed toward said feedback mirror;
   a gain medium disposed between said feedback mirror and said back mirror for resonating optical radiation in a predetermined wavelength range between said back mirror and said feedback mirror, characterized in that:
   a predetermined Fresnel zone portion of said back mirror surface is treated so as to provide a half-wavelength change in path for radiation reflected back from said back mirror surface as compared to that in the adjacent Fresnel zone so that radiation reflected back from said back mirror surface through said unstable optical cavity is preferentially resonated in a predetermined mode.

2. A resonator according to claim 1, in which said predetermined Fresnel zone portion is the central Fresnel zone, which covers a circular central portion of said back mirror surface.

3. A resonator according to claim 2, in which said feedback mirror and back mirror are disposed with predetermined positions and surface contours to form a confocal unstable optical resonator for generating a collimated output beam passing through an output aperture region, whereby radiation in said collimated output beam in said output aperture region that is reflected from said central Fresnel zone is in phase with corresponding radiation reflected from said adjacent Fresnel zone.

* * * * *